US012122551B2

(12) United States Patent
Segroves et al.

(10) Patent No.: US 12,122,551 B2
(45) Date of Patent: *Oct. 22, 2024

(54) WIRE GUIDE ASSEMBLY FOR A LABEL APPLICATOR

(71) Applicant: Panduit Corp., Tinley Park, IL (US)

(72) Inventors: Roger D. Segroves, Lockport, IL (US); Kevin L Nelson, Cumming, GA (US)

(73) Assignee: Panduit Corp., Tinley Park, IL (US)

( * ) Notice: Subject to any disclaimer, the term of this patent is extended or adjusted under 35 U.S.C. 154(b) by 69 days.

This patent is subject to a terminal disclaimer.

(21) Appl. No.: 17/578,012

(22) Filed: Jan. 18, 2022

(65) Prior Publication Data

US 2022/0135271 A1 May 5, 2022

Related U.S. Application Data

(63) Continuation of application No. 17/121,957, filed on Dec. 15, 2020, now Pat. No. 11,261,001.

(60) Provisional application No. 62/955,102, filed on Dec. 30, 2019.

(51) Int. Cl.
*B65C 3/02* (2006.01)

(52) U.S. Cl.
CPC .................................... *B65C 3/02* (2013.01)

(58) Field of Classification Search
CPC ....................................................... B65C 3/02
See application file for complete search history.

(56) References Cited

U.S. PATENT DOCUMENTS

| | | | | |
|---|---|---|---|---|
| 1,145,823 A * | 7/1915 | Woodland | A24D 1/16 156/481 |
| 3,625,800 A * | 12/1971 | Hendrix | B65C 3/02 156/481 |
| 4,264,398 A * | 4/1981 | Pruitt | B65H 81/06 156/468 |
| 4,813,571 A | 3/1989 | Slagter | |
| 4,944,829 A * | 7/1990 | Tuttle | B65C 3/02 156/499 |
| 5,875,618 A | 3/1999 | Sodies et al. | |
| 7,757,739 B2 | 7/2010 | Fries et al. | |
| 7,905,266 B2 * | 3/2011 | Sugiyama | B65B 27/06 156/428 |
| 8,033,312 B2 | 10/2011 | Fries et al. | |
| 8,186,408 B2 | 5/2012 | Fries et al. | |
| 8,708,018 B2 | 4/2014 | Boulay et al. | |
| 8,826,960 B1 | 9/2014 | Bennett et al. | |
| 9,868,559 B2 | 1/2018 | Li et al. | |
| 10,035,618 B1 | 7/2018 | Bennett et al. | |
| 2004/0206459 A1 | 10/2004 | Schanke et al. | |

(Continued)

FOREIGN PATENT DOCUMENTS

CN 108146756 A 6/2018

*Primary Examiner* — Philip C Tucker
*Assistant Examiner* — John Blades
(74) *Attorney, Agent, or Firm* — Peter S. Lee; Christopher S. Clancy; James H. Williams

(57) ABSTRACT

A wire guide assembly is provided for the accurate labeling of different diameter elongated objects, wires, or cables within a wrapping mechanism of an elongated object label applicator. The label applicator guide permits elongated objects of different diameters to be placed within substantially the center of the wrapping mechanism to continuously facilitate proper application of a label to different sized elongated objects.

9 Claims, 9 Drawing Sheets

(56) References Cited

U.S. PATENT DOCUMENTS

| | | | | |
|---|---|---|---|---|
| 2008/0073023 | A1 * | 3/2008 | Fries | B65C 3/02 156/443 |
| 2013/0019565 | A1 * | 1/2013 | Witkiewicz | B65C 9/32 53/203 |
| 2019/0263552 | A1 * | 8/2019 | Nelson | B65C 3/02 |

* cited by examiner

WIRE GUIDE ASSEMBLY FOR A LABEL APPLICATOR

CROSS-REFERENCE TO RELATED APPLICATION(S)

This application is a continuation of U.S. patent application Ser. No. 17/121,957, filed on Dec. 15, 2020, which claims benefit to U.S. Provisional Patent Application No. 62/955,102, filed Dec. 30, 2019, the entirety of all of which is hereby incorporated in their entirety within.

SUMMARY

This disclosure relates to a wire guide assembly for a label applicator that provides for the accurate labeling of different diameter elongated objects, wires, or cables within a wrapping mechanism of an elongated object label applicator. The presently disclosed label applicator guide is configured to permit elongated objects of different diameters to be placed within substantially the center of the wrapping mechanism to continuously facilitate proper application of a label to different sized elongated objects.

According to some embodiments, an elongated object applicator is disclosed, wherein the elongated object applicator comprises a first driver, a wrapping assembly including a wrapping mechanism comprising a plurality of guide rollers spaced about a central portion, a belt tensioned around the guide rollers and across an opening in the central portion through which an object to be labeled is received, and at least one guide assembly disposed on a first side of the wrapping assembly. The at least one guide assembly comprising a body portion with a slide disposed on a distal end of the body portion configured to interact with a rail on the wrapping assembly and a guide post disposed on a top of the body configured to accept an object for labeling, and a gauge slidably mounted to the body and configured to actuate the wrapping mechanism upon the object entering the wrapping position.

BRIEF DESCRIPTION OF THE DRAWINGS

To understand the present disclosure, it will now be described by way of example, with reference to the accompanying drawings in which.

DETAILED DESCRIPTION

Figure 1:
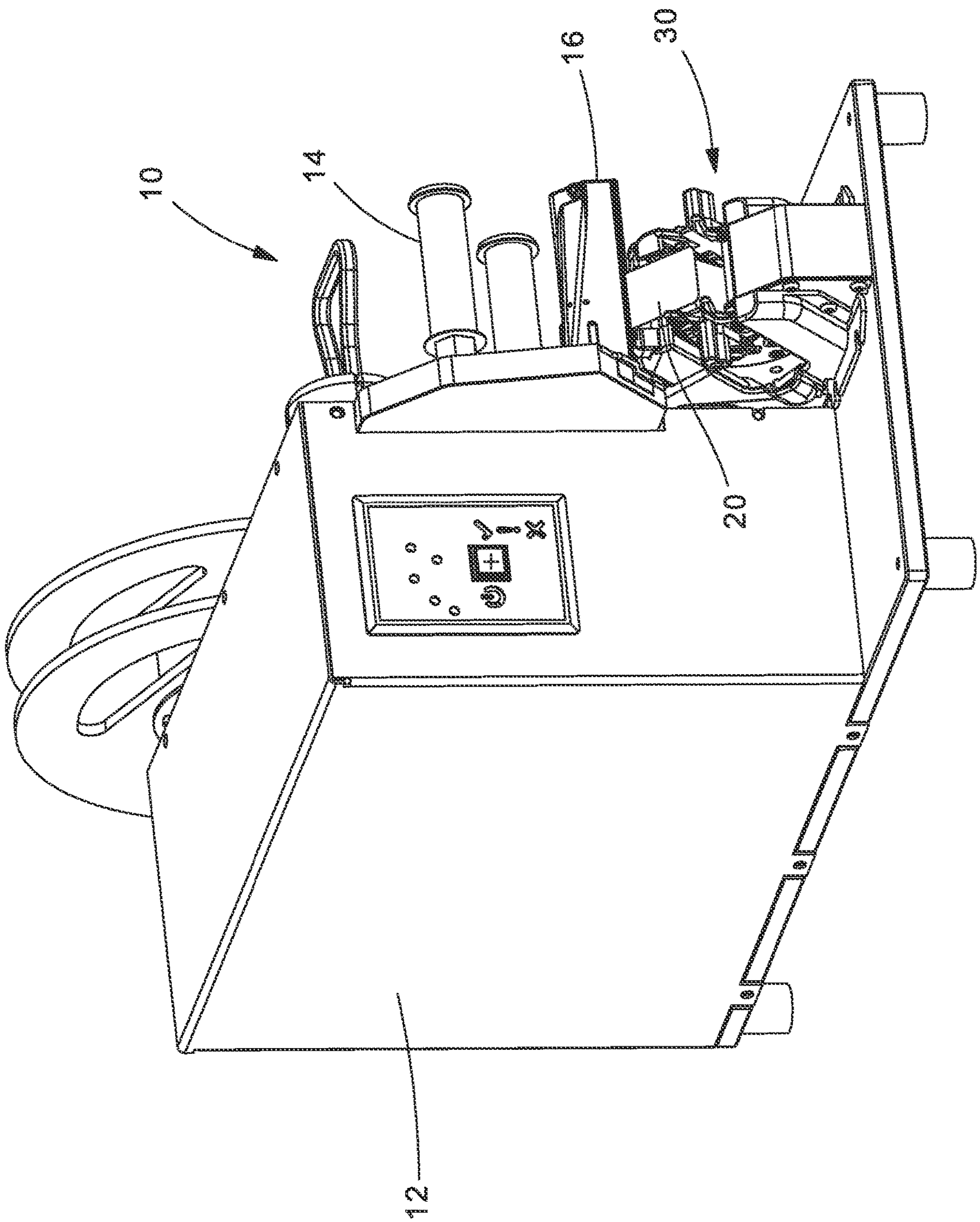
FIG. 1 is a perspective view of an elongated label applicator, according to an embodiment.

While the described features are provided for embodiments in many different forms, there is shown in the drawings and will herein be described in detail preferred embodiments with the understanding that the present disclosure is to be considered as an exemplification of the principles of the features and is not intended to limit the broad aspect of the features to the embodiments illustrated.

The disclosed label applicator guide solves or improves upon one or more disadvantages with presently known wire guides for label applicators. The present wire guide assembly provides for the accurate labeling of different diameter elongated objects, wires, or cables within a wrapping mechanism of an elongated object label applicator. The presently disclosed label applicator guide is configured to permit elongated objects of different diameters to be placed within substantially the center of the wrapping mechanism to continuously facilitate proper application of a label to different sized elongated objects.

Referring generally to the figures, automated apparatuses for applying printed labels to wires, cables or other elongated objects of varying diameters are illustrated. Labels are wrapped around the objects without spinning the objects about their elongated longitudinal axes. The apparatuses are particularly useful for label types that require the label be wrapped around an object using more than one revolution. Self-laminating labels are one such type, requiring a transparent end of the label to be wrapped over top of a printed region to provide protection to the printed content. Once such example of a label applicator is disclosed in U.S. patent application Ser. No. 16/279,298, which is incorporated by reference here in its entirety.

Turning to the drawings, FIG. 1 illustrates an elongated object label applicator 10. Label applicators 10 are comprised of several systems. These systems include a label applicator or printer 12, a media roller or incoming conveyor 14, a label peel-and-present mechanism 16, and a wrapping assembly 30. Each of these systems are utilized in the application of a label 20.

Figure 2:
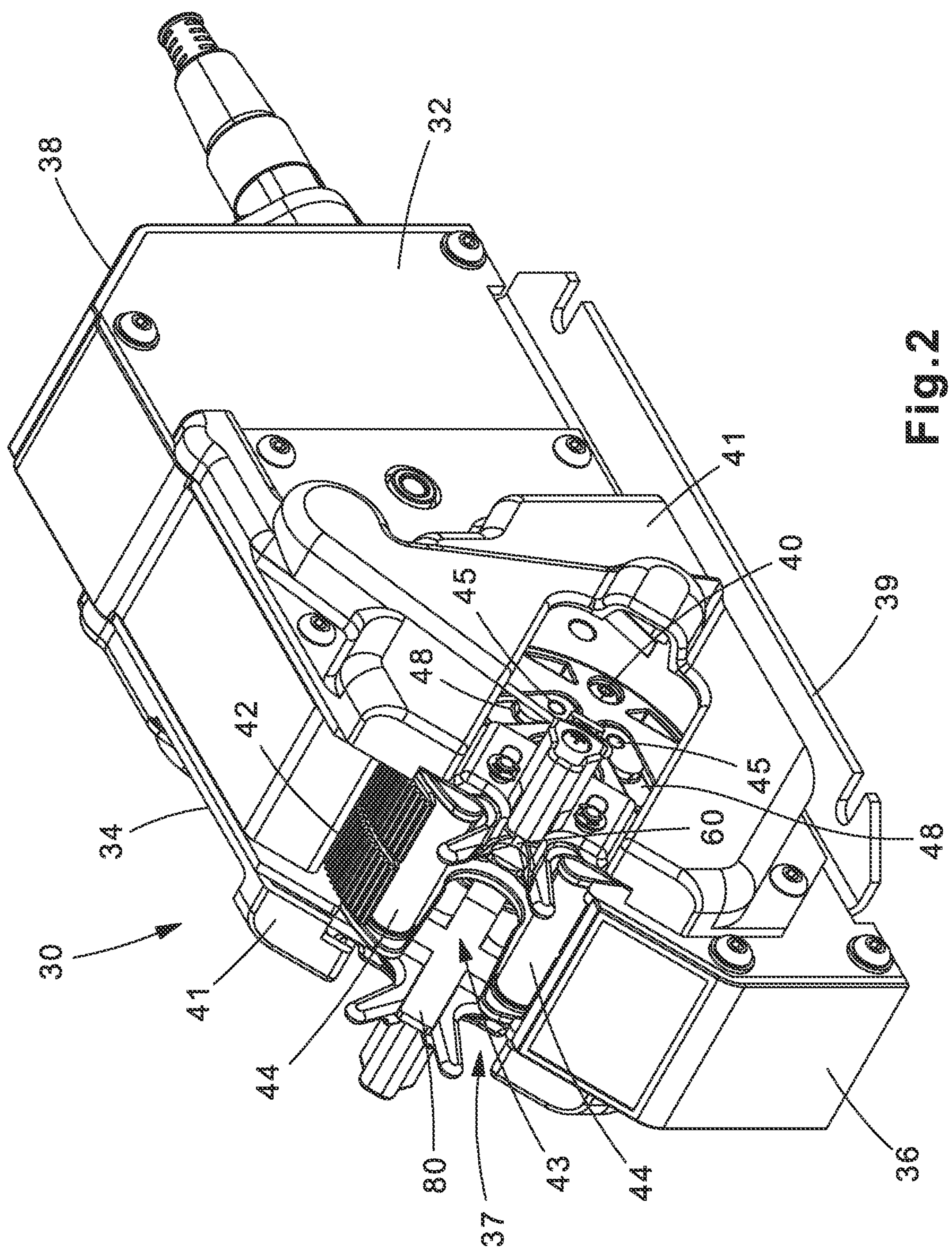
FIG. 2 is a perspective view of a wrapping mechanism included in the elongated label applicator illustrated in FIG. 1.

FIG. 2 illustrates the wrapping assembly 30 of the label applicator 10. The wrapping assembly 30 includes a first side 32, second side 34, front 36, rear 38, and bottom 39. The wrapping assembly 30 includes covers 41 on the first side 32 and second side 34. The covers 41 conceal certain internal components of the wrapping assembly 30. An opening 37 is located on the front 36. The wrapping assembly 30 is configured as a housing for a wrapping mechanism 40, driver and associated components, as well as the wire guide assembly 60. The wrapping mechanism 40 and wire guide assembly 60 are accessible through the opening 37.

Figure 8:
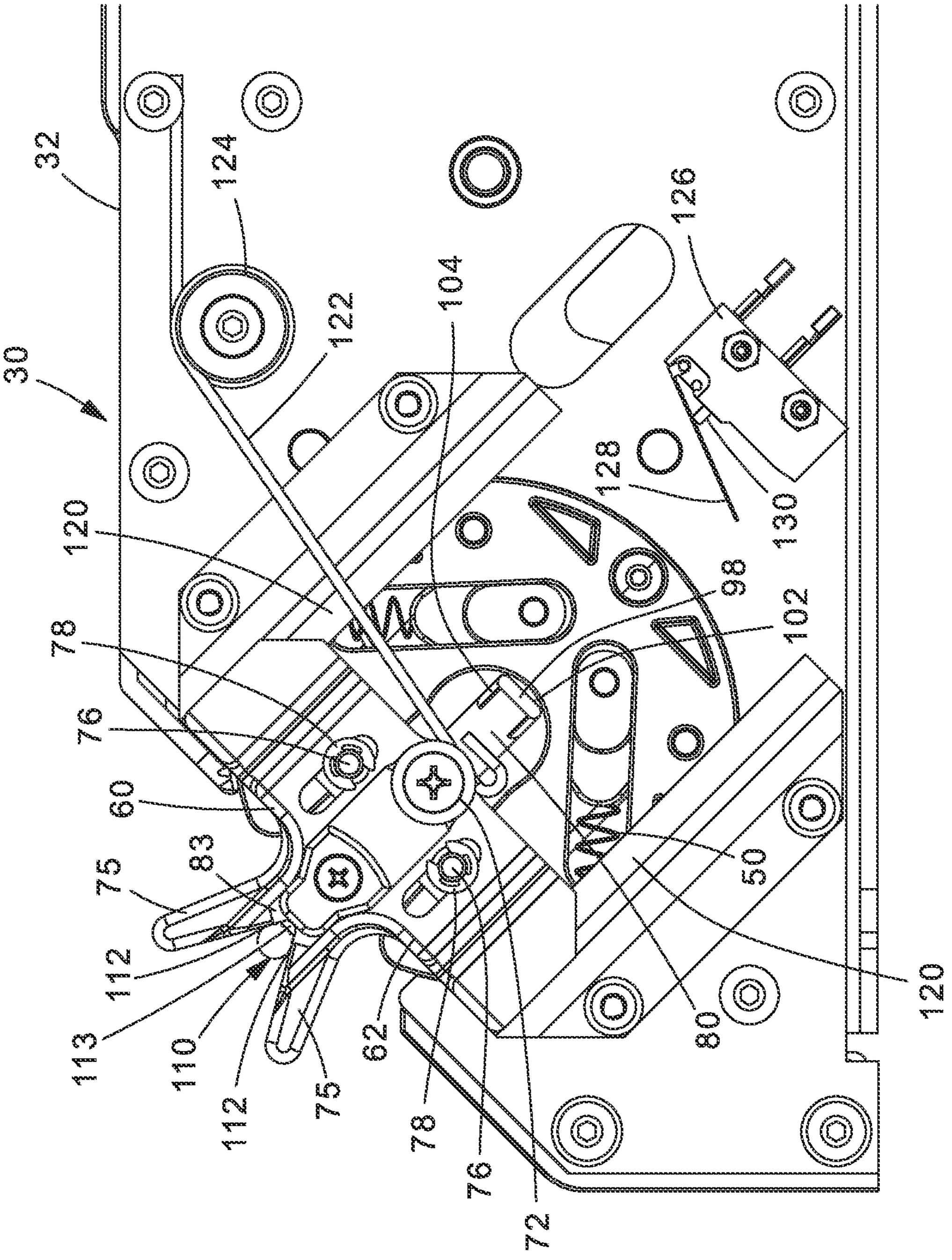
FIG. 8 is a side view of the wrapping mechanism illustrated in FIG. 2, with the wire guide assembly in a biased-up state.
Figure 9:
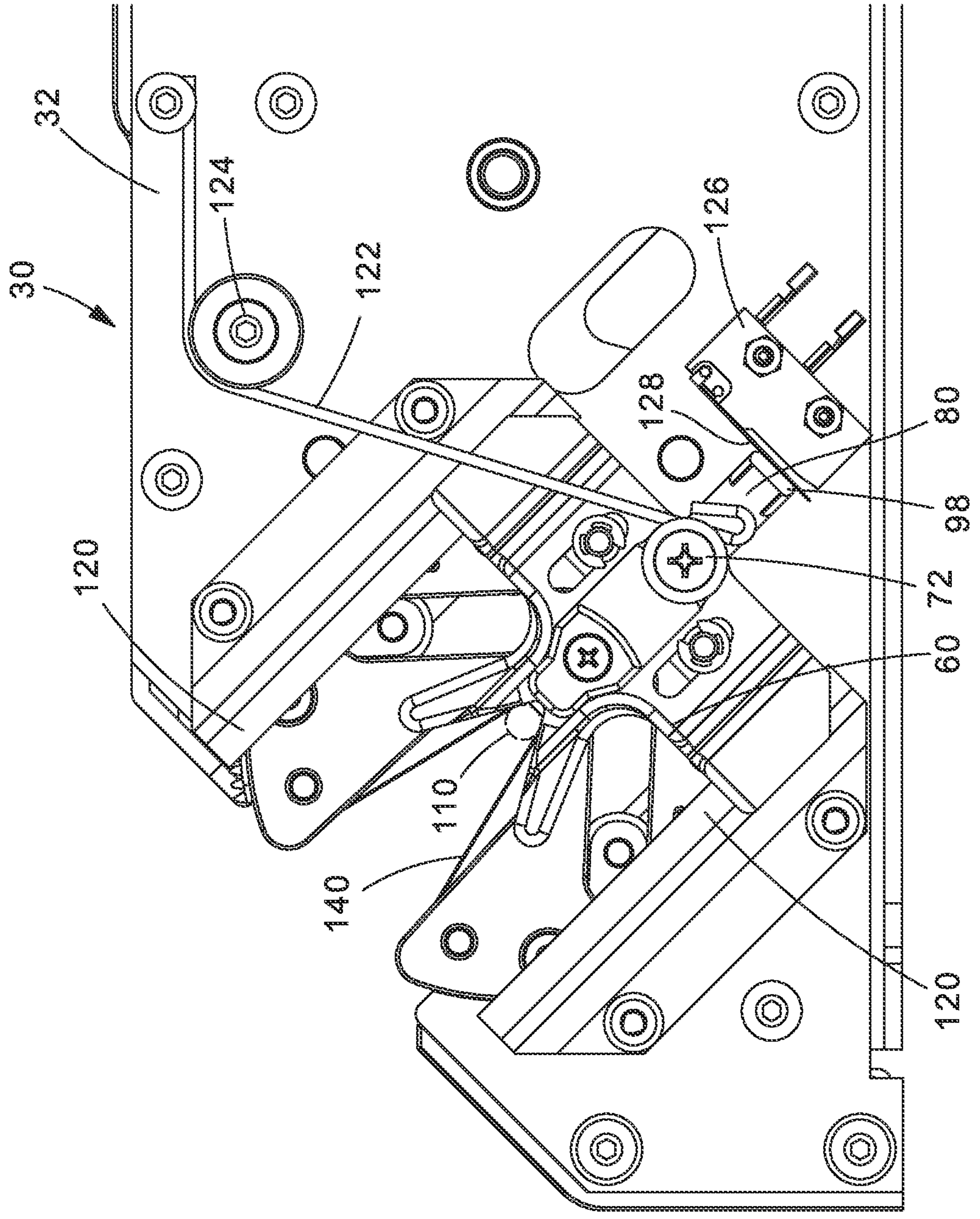
FIG. 9 is a side view of the wrapping mechanism illustrated in FIG. 2, with the wire guide assembly in depressed down state.

The wrapping mechanism 40 is cylindrical in shape and is rotatable about an axis at a center. The wrapping mechanism 40 may be rotated by a driver, such as a motor, and/or a gear train (not shown). The driver acts on teeth 42 on an exterior of the wrapping mechanism 40, to rotate the wrapping mechanism 40 around at least 360 degrees. The wrapping mechanism 40 includes a plurality of guide rollers internal to the wrapping mechanism 40. For example, a first set of guide rollers 44 are spaced at a top of the wrapping mechanism 40 creating a central portion 43. A second set of guide rollers 45 are located near the center of the wrapping mechanism 40 (See FIG. 8). The guide rollers 44, 45 are configured to support a belt 140 (FIG. 9). The second set of guide rollers 45 are supported between tensioner arms 48 that are held in tension with extension springs 50 (FIG. 8). The tensioner arms 48 remove slack in the belt 140 and keep the belt 140 straight and taught and at the same time, allow the belt 140 to be pushed into the central portion 43 by an elongated object or wire that is to be labeled.

As illustrated in FIG. 2, the wire guide assemblies 60 are located on the first side 32 and second side 34 of the wrapping assembly 30. Each of the wire guide assemblies 60 are slidably connected to the wrapping assembly 30 as described in more detail below in connection with FIG. 8 and FIG. 9.

Figure 3:
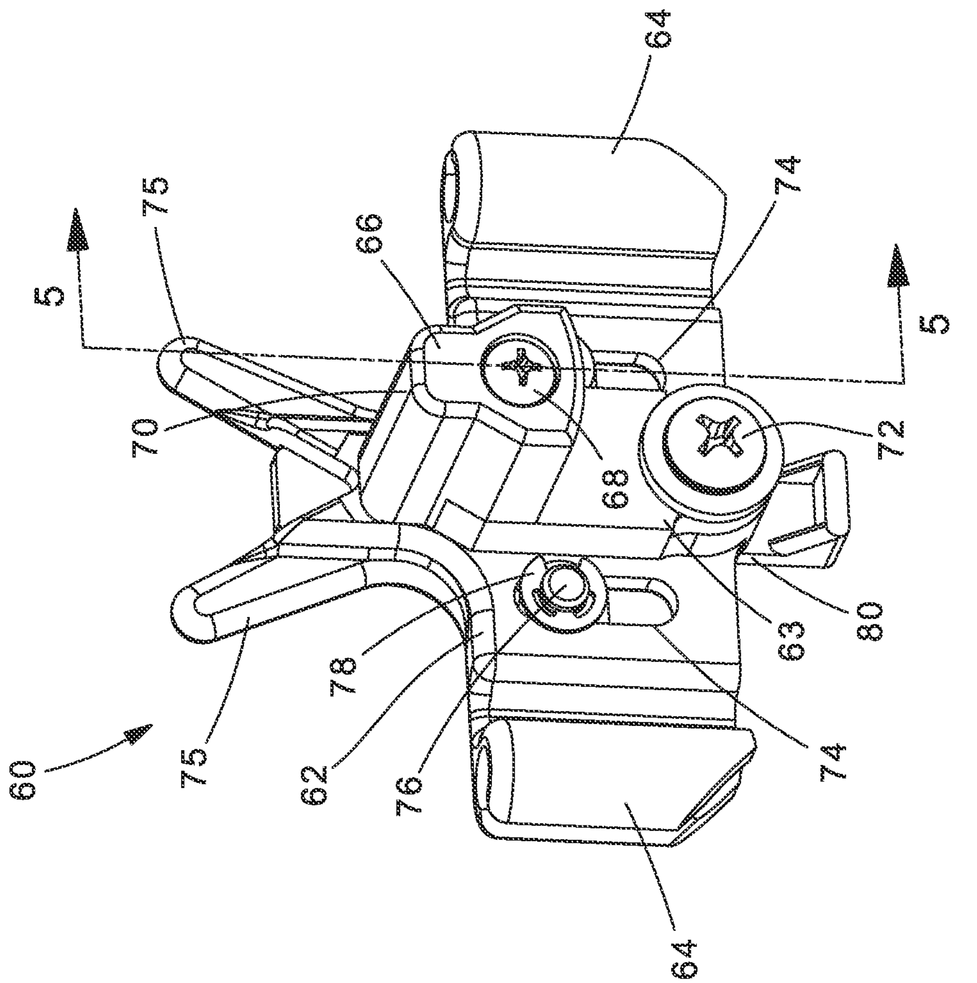
FIG. 3 is a front-side perspective view of a wire guide assembly included in the wrapping mechanism illustrated in FIG. 2.

FIG. 3 illustrates the first side 32 view of the wire guide assembly 60. The wire guide assembly 60 includes a body portion 62. The body portion 62 supports the features of the wire guide assembly 60. The body portion 62 includes a slide 64 on each distal side end. The slide 64 is configured to connect to the wrapping assembly 30 as further described in more detail below in connection with FIG. 8 and FIG. 9.

Referring to FIG. 3, disposed in approximately the center of the body 62 is a housing 63. The housing 63 extends out from the body 62, creating a further depth or thickness to the body 62. A finger grip 66 extends out from the housing 63. The finger grip 66 extends perpendicularly out from the housing 63. The finger grip 66 is depicted as being narrower at the top and wider at the bottom. The finger grip 66 includes a fastener 68 at the end of the finger grip 66 that functions to retain a foam cover 70 over the finger grip 66. The foam cover 70 permits a suitable friction connection between the wire and the finger grip 66 to hold the wire in place during movement of the wire guide 30 and application of the label 20.

As further illustrated in FIG. 3, a second fastener 72 resides on the housing 63, just below the finger grip 66. This second fastener 72 attaches to the housing 63 and functions to retain a spring return as further described below in relation to FIGS. 8 and 9.

FIG. 3 further illustrates two elongated openings 74 disposed on the body 62 on each side of the finger grip 66. The elongated openings 74 extend from slightly below the top of the body 62 to slightly above the bottom of the body 62. The elongated openings 74 are sized to accept a blade post 76 attached to a blade 80. The blade post 76 is retained within the elongated opening 74 by C-clip 78. Other suitable retaining fasteners and mechanisms may be implemented to hold the blade 80 against the body 62.

Figure 4:
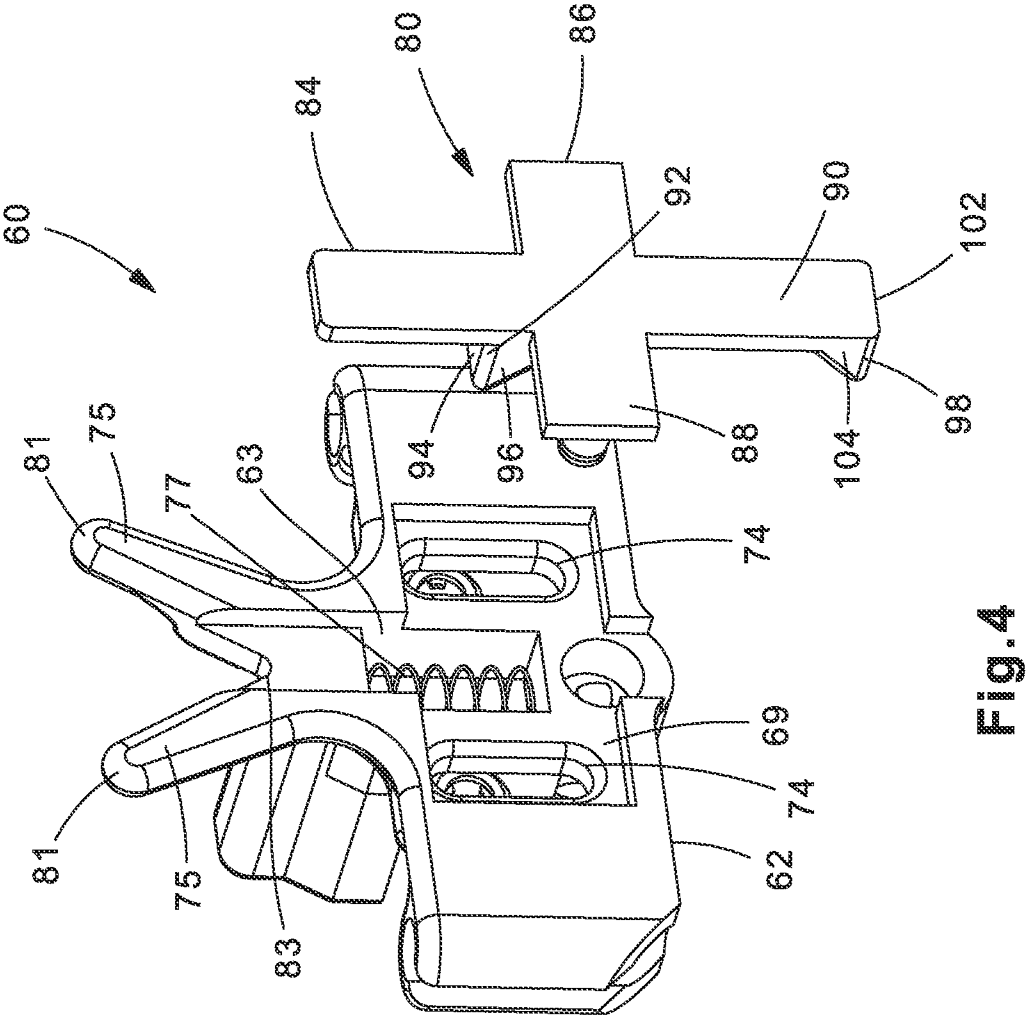
FIG. 4 is an exploded back-side perspective view of the wire guide assembly illustrated in FIG. 3.

FIG. 3 and FIG. 4 illustrate guide posts 75 extending vertically from the top of the body 62. The guide posts 75 form a V-shaped configuration, with the widest portion being at the top 81 of the guide posts 75 and narrowest portion being at a bottom portion 83 of the V-shape configuration where the guide posts 75 converge. The guide posts 75 are configured to orient a wire 110 within the wire guide assembly 60, as illustrated, for example, in FIG. 6.

FIG. 4 illustrates an inside portion of the body 62 that is disposed directly adjacent the central portion 43 of the wrapping mechanism 40. This side of the body 62 includes a recess 69, formed in the housing 63. The recess 69 is shaped as an inverted cross-shaped configuration with the open end of the recess 69 being open at the bottom portion 83 of the V-shaped configuration of the guide posts 75. As depicted in FIG. 4, the recess 69 encompasses the elongated openings 74 as described above. The housing 63 extends into the body 62 therefrom, creating a hollow column. The housing 63 is column shaped and extends vertically within the body 62. The housing 63 is configured to include a return spring 77 or other return biased mechanism.

As shown in the exploded view of FIG. 4, the blade 80 may be detached from the body 62 of the wire guide assembly 60. When assembled into the wire guide assembly 60, the blade 80 is shaped to fit, at least in part, within the recess 69 of the body 62. The blade 80 is shaped in a cross-like configuration with a top 84, first side 86, second side 88, and a bottom 90. The height of the first side 86 and second side 88 is less than the height of the recess 69 in which the first side 86 and second side 88 are configured to reside within. The top 84 includes a stop 92 that extends out perpendicularly from the top 84. The stop 92 includes a horizontal ledge 94 and two vertical side walls 96. The stop 92 is configured to encompass the return spring 77. At the bottom 90 of the blade 80 is an actuator 98. The actuator 98 extends out perpendicularly from the bottom 90 and includes horizontal lower ledge 102 and sidewalls 104. The actuator 98 is configured to act on a switch 126 (e.g., illustrated in FIG. 9) to actuate the wrapping mechanism 40, which is described more fully below.

The first side 86 and second side 88 of the blade 80 includes the blade posts 76 that extend out from each of the first side 86 and second side 88. The blade posts 76 may be cylindrical shaped posts that include threaded or notched ends for the acceptance of a fastener, such as the C-clip 78.

Figure 5:
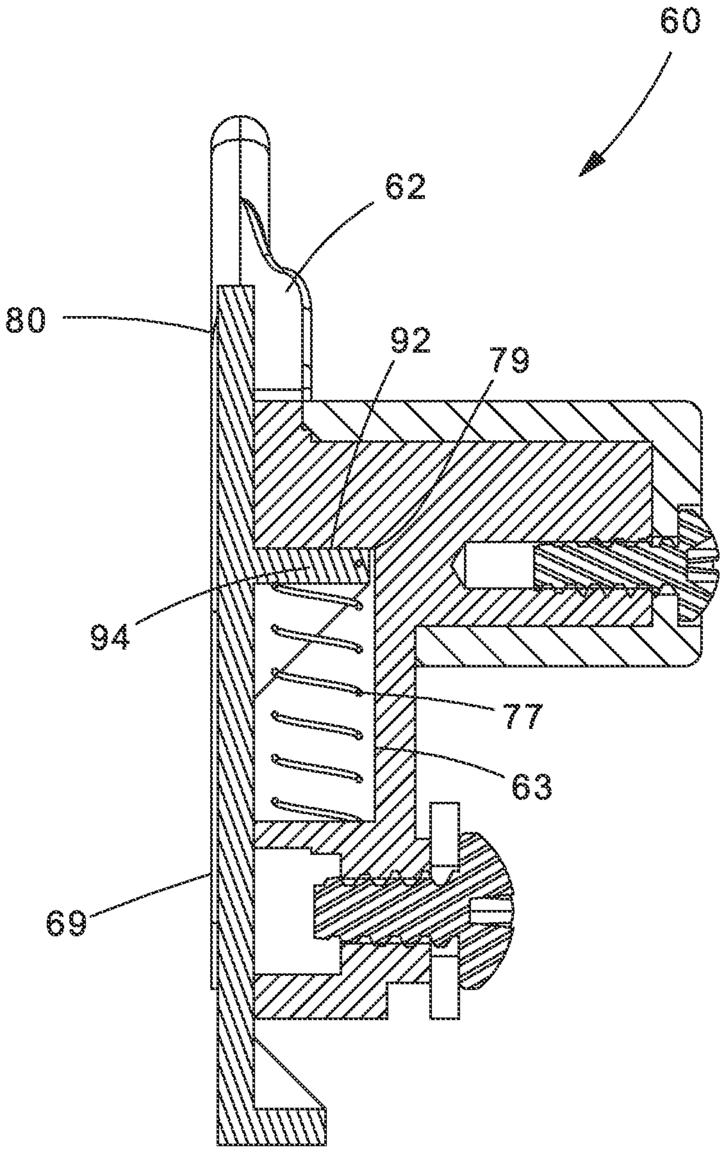
FIG. 5 is a sectional side view of the wire guide assembly illustrated in FIG. 3 taken along the line 5-5.

FIG. 5 shows a sectional view of the wire guide assembly 60 taken along line 5-5 shown in FIG. 3. The blade 80 resides in the recess 69 and housing 63 of the body 62. The blade posts 76 (not specifically illustrated in FIG. 5) retain the blade 80 horizontally in an x-direction within the recess 69. Further, the stop 92 extending from the top 84, resides within the housing 63. The stop 92 retains the return spring 77 and an underside of the ledge 94 of the stop 92 receives the force of the return spring 77, causing the blade 80 to be in an upwardly biased position. The return spring 77 biases the blade 80 upwards until the ledge 94 contacts an upper portion 79 of the housing 63. The return spring 77 permits the blade 80 to slide independently of the body 62 within the recess 69, when the top 84 of the blade 80 is acted upon by the wire as described below.

Figure 6:
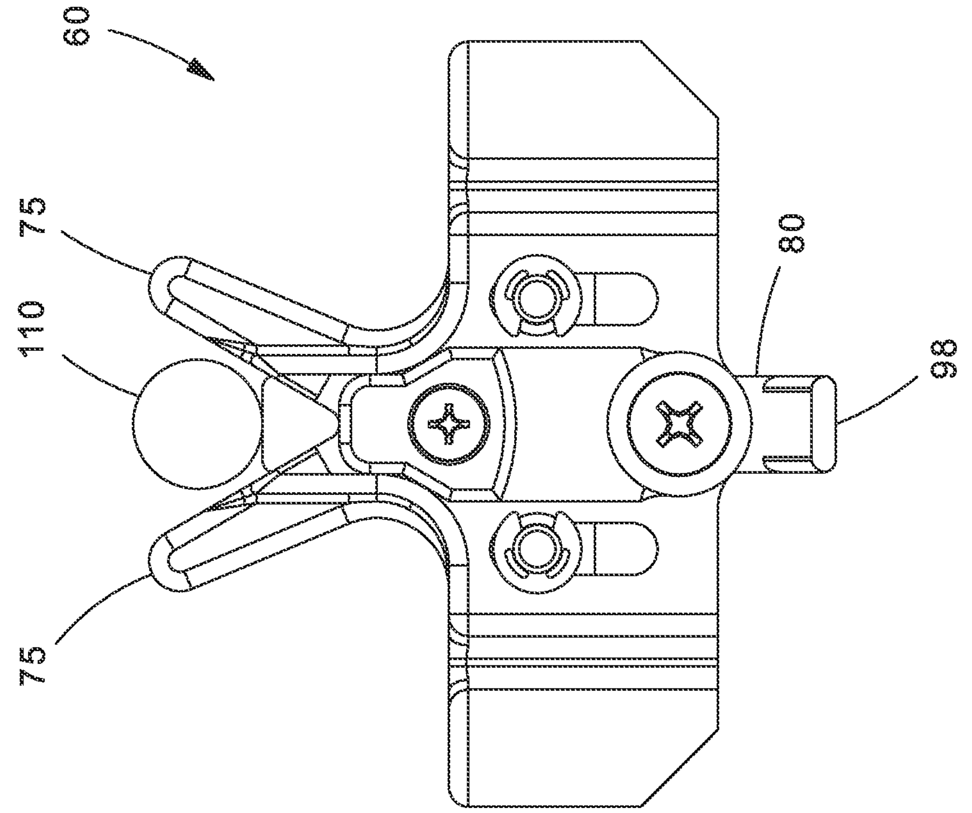
FIG. 6 is a front-side view of the wire guide assembly illustrated in FIG. 3, with a blade of the wire guide assembly in a biased-up state.

FIG. 6 illustrates the wire guide assembly 60 with the wire 110 placed in an initial position for labeling (i.e., biased-up state). In this position, the wire 110 is located between the guide posts 75 and slightly above or resting on the blade 80, but not acting any substantial force thereon. The blade 80 is in a first or uppermost biased-up position. Likewise, the actuator 98 is also in a the biased-up state where the actuator 98 is positioned at an uppermost position.

Figure 7:
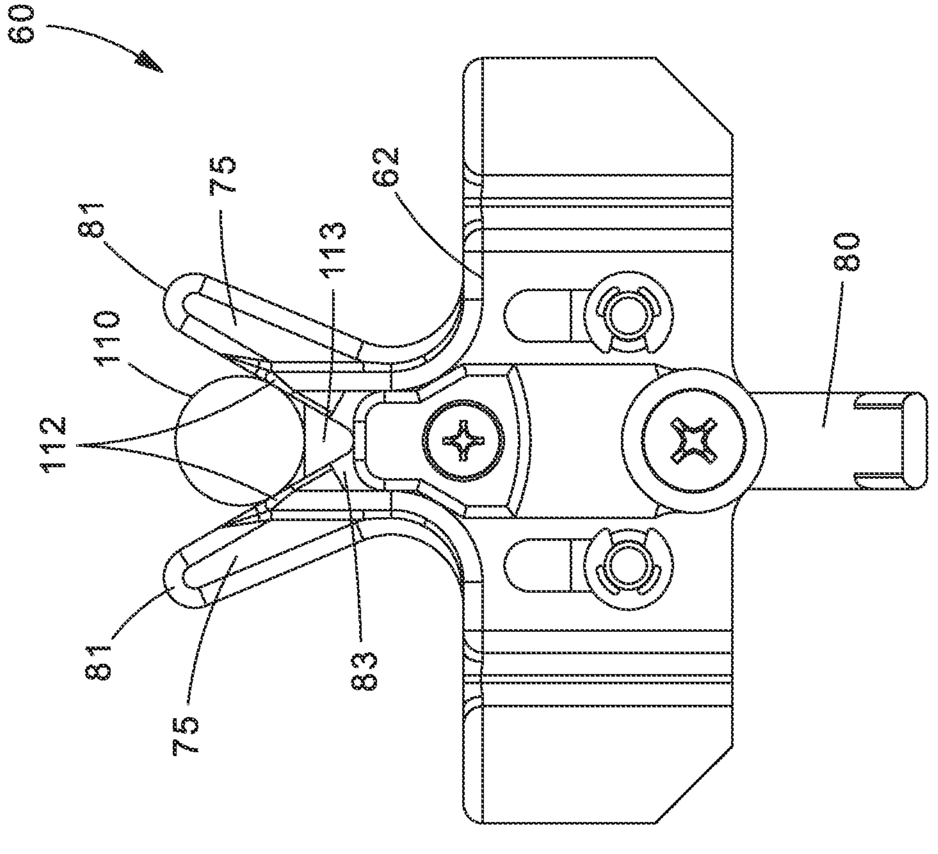
FIG. 7 is a front-side view of the wire guide assembly illustrated in FIG. 3, with a blade of the wire guide assembly in a depressed down state.

FIG. 7 illustrates an instance where a downward force is acted on the wire 110 to position the wire 110 into an application or secondary position (i.e., depressed down state). The wire 110 is in contact with the guide posts 75 at first tangent points 112 on the wire 110 in this application or secondary depressed down position. The contact by the wire 110 with the guide posts 75 prevents the wire 110 from traveling farther down into the guide posts 75. The wire 110 is now in contact with the top 84 of the blade 80 at a second tangent point 113 on the blade 80. The blade 80 has been moved to the depressed down position in this instance. In the depressed down state, the blade 80 has displaced downward by the wire 110 in an amount dependent upon the size or diameter of the wire. Likewise, the actuator 98 has also been moved lower, the same distance as moved by the wire 110 contacting the blade 80.

The length of the V-shaped guide posts 75 (e.g., distance from top 81 to bottom 83 of the guide posts 75) and distance between the top 81 of the V-shaped guide posts 75 and the body 62, as well as the radius or size at the bottom 83 of the V-shaped guide posts 75 may be adjusted depending on the application, size (diameter), or type of the wire 110 or elongated object intended for labeling. A maximum diameter wire 110 accepted into the wrapping mechanism 40 may be established by the distance between the tops 81 of the guide posts 75. The farther the tops 81 of the guide posts 75 are spaced from each other, the larger the wire may be that is accepted into the wire guide assembly 60. Similarly, the radius at the bottom 83 of the guide posts 75 may be modified such that a minimum sized diameter wire 110 is intended to be utilized within the wire guide assembly 60. The radius of the bottom 83 of the guide posts 75 will dictate the smallest size of wire 110 that can both contact the internal side walls 85 and the top 84 of the blade 80 at the same time.

It is contemplated that the lengths of the guide posts 75 may be extended or shortened in length to accommodate for an increased or decreased diameter of wire 110. It is also contemplated that the size or shape of the blade 80 may be modified to accommodate for different wire diameters or elongated object configurations.

FIG. 8 and FIG. 9 illustrate the wrapping assembly 30 of FIG. 2, viewed from a prospective of the first side 32, with the cover 41 removed. It is understood that each of the first side 32 and second side 34 of the wrapping assembly 30 may include the same components. FIG. 8 illustrates the wire guide assembly 60 in a first position according to the biased-up state. FIG. 9 illustrates the wire guide assembly 60 in a second position according to the depressed down state, where the wrapping assembly 30 has placed the object in position to wrap a label around the wire 110. The depressed down state may also be referred to as an engagement or actuating state of the wire guide assembly 60 where components of the wire guide assembly 60 are positioned to depress a contact 130 for the switch 126 as will be discussed in further detail below.

As illustrated in FIG. 8 and FIG. 9, the wire guide assembly 60 is mounted to rails 120 of the wrapping mechanism 40 via the slides 64 of the wire guide assembly 60. The slides 64 mount to the rails 120 and function to permit the wire guide assembly 60 to slide upon the rails 120. As illustrated in FIG. 8, the wire guide assembly 60 is biased to the top of the wrapping mechanism 40 by a retention spring 122. The retention spring 122 is mounted to each of the first side 32 and the second side 34 of the wrapping assembly 30 via a fastener 124. An arm of the retention spring 122 is located underneath the second fastener 72 of the wire guide assembly 60.

The switch 126 is mounted to each of the first side 32 and the second side 34 of the wrapping assembly 30 by one or more fasteners. Alternatively, a single switch 126 may be utilized on either the first side 32 or second side 34 for activation of the wrapping mechanism 40. The switch 126 includes an arm 128 that is pivotably mounted to the switch 126. The switch 126 also includes the contact 130. The arm 128 is configured to rotate about a pivot point and depress the contact 130, thus activating the wrapping mechanism 40 when the contact 130 is depressed. Where a switch 126 is utilized on the first side 32 and second side 34 of the wrapping assembly 30, it is contemplated that the contact 130 may be depressed for each switch 126 on the first side 32 and second side 34 of the wrapping assembly 30 before the wrapping mechanism 40 is activated. Conversely, where only a single switch 126 is utilized on the wrapping assembly 30, the wrapping mechanism 40 may be activated by depression of the single contact 130 of the single switch 126.

As illustrated in FIG. 8, the wire guide assembly 60 is in the first position wrapping assembly 30, in preparation for labeling of the wire 110. The wire guide assembly 60 is in the upward biased position atop the rails 120. The retention spring 122 is acting a force upon the fastener 72 of the wire guide assembly 60 to place the wire guide assembly 60 in the first position. The switch 126 is in the off position. The arm 128 of the switch 126 is pivoted up and is not depressing the contact 130. The wire 110 is located within wire guide assembly 60, with a portion of the wire residing between the guide posts 75 and portions overlaying the finger grip 66 on each of the first side 32 and second side 34 of the wrapping mechanism 30. The wire 110 may be resting on or just above the blades 80 without any force acting on the blades 80.

In order to set the desired blade 80 position to begin actuation of the wrapping mechanism, the wire 110 will be placed taught across the wire guide assemblies 60 on the first side 32 and second side 34 of the wrapper assembly 30, placing the wire 110 in tension. A user may then press the portions of the wire 110 overlaying portions of the finger grip 66 on each of the first side 32 and second side 34 of the wrapping assembly 30 into the foam cover 70 and against the finger grip 66. This action will cause the wire 110 between the wire guide assemblies 60 to move towards the bottom 83 of the guide posts 75 until the tangent points 112 of the wire 110 contact the guide posts 75 and the wire 110 can no longer travel towards the bottom 83. As described above, the diameter of the wire 110 will dictate the depth of travel of the wire 110 within the V-shaped guide posts 75.

During the above described motion, the second tangent point 113 of the wire 110 will contact the blade 80. As the wire 110 continues to move towards the bottom 83 after contacting the blade 80, the wire 110 will cause the blade 80 to slide or move downwards independent of the body 62. The spring 77 (not viewable) of the wire guide assembly 60 acts on the blade 80 to keep the blade 80 in contact with the wire 110 and ensure the blade 80 is in the desired position as dictated by the diameter of the wire 110. The entire blade 80 will slide downwards, which includes the actuator 98 of the blade 80. The distance between the lower leg 102 of the actuator 98 and the bottom of the body 62 has now increased. On the other hand, the actuator 98 is now closer in distance to the switch 126 for actuation of the wrapping mechanism 40. The blade 80 and its configuration to slide independent of the body 62 of the wire guide assembly 60 functions to position the depth of the wire 110 substantially at the center or axis of rotation of the wrapping mechanism 40 as well as to initiate the rotational actuation of the wrapping mechanism 40 at that position.

Following the above positioning of the blade 80, the user may continue to hold the wire 110 taught across the wire guide assemblies 60 and apply a downward force to the finger grips 66. The downward force will cause each of the wire 110 and wire guides 60, including the blades 76, to slide down the rails 120. In a first distance of travel, the wire 110 will contact belt 140 (not visible in FIG. 8). As the wire 110 and wire guides 60 continue to slide down the rails 120, they force the belt 140 into the central portion 43 of the wrapping mechanism 40 against a tension of the springs 50.

The wire guides 60 will further continue to travel down the rails 120 to a point at which the actuator 98 of the blade 80 comes in contact with the arm 128 of the switch 126, as illustrated in FIG. 9. The actuator 98 will cause the arm 128 to pivot to a closed position and depress the contact 130. The contact between the actuator 98 of the blade 80 and the switch 126 acts to stop further downward travel of the wire guide assembly 60 and wire 110. When the contact 130 is depressed, the switch 126 will actuate the wrapping mechanism 40, causing the wrapping mechanism 40 to spin about the wire 110 and apply a label as described in U.S. patent application Ser. No. 16/279,298. At this position, the wire 110 will be in a wrapping position and in substantially the center of the rotational axis of the wrapping mechanism 40.

While the specific embodiments have been illustrated and described, other modifications may be applied without significantly departing from the spirit of the disclosure, and the scope of protection is only limited by the scope of the accompanying claims.

What is claimed is:

1. An object label applicator comprising:

a wrapping assembly including a rotatable wrapping mechanism, the wrapping mechanism comprising:

a plurality of guide rollers spaced about a central portion; and a belt tensioned around the plurality of guide rollers and positioned across an opening in the central portion through which an object to be labeled is received; and a guide assembly configured to transition between a first state and a second state when receiving an object for labeling within a "V" shaped portion comprised of a first guide post and a second guide post;

a blade located within the guide assembly and configured to move from a biased-up state during the first state to a depressed down state during the second state, wherein in the depressed down state the blade lowers into a cavity of the guide assembly and engages a switch to actuate the wrapping mechanism; and wherein when the guide assembly is in the first state the guide assembly is positioned across the opening in the central portion of the wrapping mechanism and the object for labeling is held between the first guide post and the second guide post, and when the guide assembly is in the second state the object for labeling is lowered into the vertex of the "V" shaped portion based, at least in part, on the lowering of the blade in the depressed down state.

2. The object label applicator of claim 1, wherein at least one of the plurality of guide rollers is rotated by a driver motor.

3. The object label applicator of claim 1, the guide assembly comprising:

a body portion including a first slide and a second slide, the first slide and the second slide respectively located on distal ends of the body portion, wherein the first slide and the second slide are configured to interact with a respective first rail and a second rail included on the wrapping assembly to move the guide assembly between the first state and the second state.

4. The object label applicator of claim 3, wherein the blade is biased towards the biased-up state by a spring stored within a housing cavity of the body portion.

5. The object label applicator of claim 4, wherein the blade comprises a stop member configured to engage the spring, and further comprises an actuator configured to engage the switch.

6. The object label applicator of claim 3, wherein the blade is positioned within a recess of the body portion and configured to slide along an axis within the recess of the body portion when moving between the biased-up state to the depressed down state.

7. The object label applicator of claim 3, wherein the "V" shaped portion is formed by the first guide post and the second guide post angled together to form the vertex of the "V" shaped portion where the guide posts come together, wherein the guide posts are configured to receive the object for labeling within the vertex.

8. The object label applicator of claim 3, the guide assembly further comprising:

a spring for being utilized in the movement of the guide assembly between the first state and the second state or between the second state and the first state.

9. The object label applicator of claim 1, further comprising:

a switch configured to actuate the wrapping mechanism when the guide assembly is positioned into the second state to physically trigger the switch.

* * * * *